United States Patent [19]

Hori

[11] 4,153,557

[45] May 8, 1979

[54] BAR SCREEN

[76] Inventor: Mitsutaka Hori, 3128-5, Koizumi-cho, Yamatokoriyama-shi, Nara-ken, Japan

[21] Appl. No.: 873,534

[22] Filed: Jan. 30, 1978

[51] Int. Cl.² .................... B01D 33/06; B01D 33/36
[52] U.S. Cl. .................................. 210/396; 210/158; 210/161; 210/402
[58] Field of Search ............... 210/154, 158, 159, 161, 210/396, 402, 497 R, 393

[56] References Cited

U.S. PATENT DOCUMENTS

| 2,963,156 | 12/1960 | Nordell | 210/159 X |
| 2,978,105 | 4/1961 | Pohem | 210/159 |
| 3,347,382 | 10/1967 | Quast | 210/159 |

FOREIGN PATENT DOCUMENTS

| 45-22912 | 8/1970 | Japan | 210/158 |
| 326285 | 1/1972 | U.S.S.R. | 210/158 |

*Primary Examiner*—William A. Cuchlinski, Jr.
*Attorney, Agent, or Firm*—Wenderoth, Lind & Ponack

[57] ABSTRACT

An improved bar screen is disclosed which has a plurality of ring bars and a plurality of scrapers mounted therebetween which are rockable away from the ring bars. Since base portion of the scrapers is always engaged between the ring bars, the scrapers may be easily reset into their operative position after they have been rotated to their cleaning position away from the ring bars.

2 Claims, 4 Drawing Figures

BAR SCREEN

BACKGROUND AND SUMMARY OF THE INVENTION

The present invention relates to an improved bar screen installed in flowing water to remove any rubbish therein.

A bar screen is known which includes a plurality of equally spaced parallel ring bars with scrapers arranged therebetween to scrape any rubbish from between the ring bars. Such a bar screen needs frequent cleaning to remove any rubbish caught between the scrapers and the ring bars and between the scrapers themselves because such rubbish interferes with the efficient operation of the bar screen.

On conventional bar screens, the scrapers are mounted so as to be completely removable from the ring bars. To reset the scrapers after cleaning, the scrapers must be brought in between the ring bars. This work was very troublesome and time-consuming.

An object of the present invention is to provide an improved bar screen which has scrapers that are easy to reset.

BRIEF DESCRIPTION OF THE DRAWINGS

Other features or advantages will become apparent from the following description taken with reference to the accompanying drawings, in which.

DETAILED DESCRIPTION OF THE INVENTION

Figure 1:
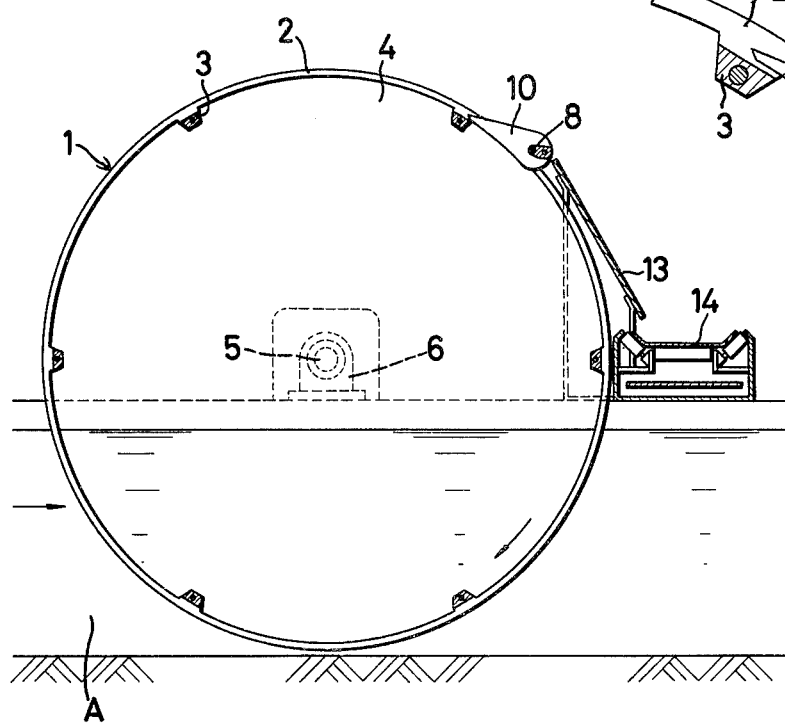
FIG. 1 is a vertical, sectional, front view of an embodiment of this invention.
Figure 3:
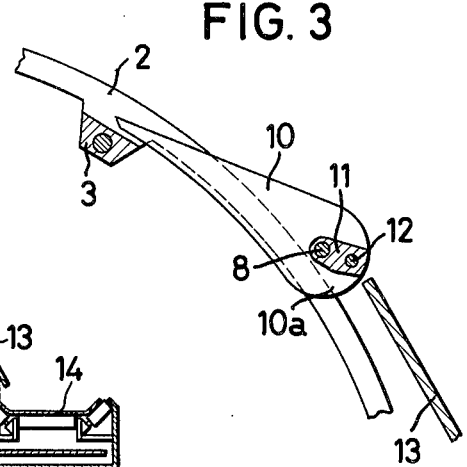
FIG. 3 is an enlarged vertical, sectional, front view of a portion thereof.

A cage-type bar screen 1 is rotatably mounted in a ditch or waterway designated by letter A so that its lower semi-circular portion is submerged in the flowing water in the ditch.

The bar screen 1 includes a plurality of ring bars 2 mounted in a vertical position with suitable spacings therebetween. These bars are coupled to one another by a plurality of reinforcing members 3 secured to the inner side thereof. The reinforcing members 3 are parallel with the axis of the bar screen and are equally spaced there around. To each end of the bar screen has secured thereto a round plate 4 to which a shaft 5 is secured. The shafts are rotatably supported by a bearing 6. The bar screen 1 is driven by a motor 7 to which one shaft 5 is coupled.

A rotary shaft 8 is axially and pivotably mounted on a stand 9 so as to be disposed slightly outside of the outer periphery of the bar screen 1, slightly below top thereof, and parallel with the axis thereof. On the rotary shaft 8 are alternately mounted scrapers 10 and spacers 11 so that the scrapers come just between the ring bars 2. The scrapers 10 and the spacers 11 are also coupled with one another by a coupling shaft 12.

Figure 2:
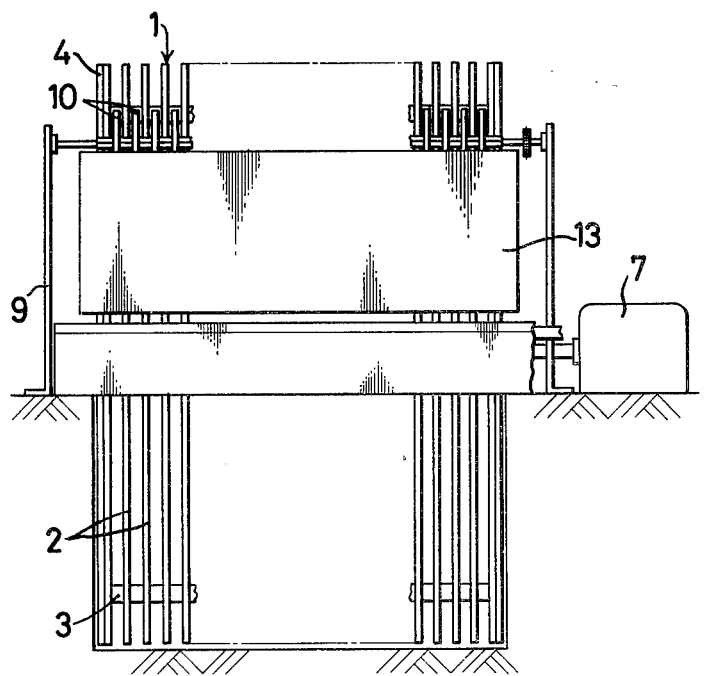
FIG. 2 is a side view thereof.
Figure 4:
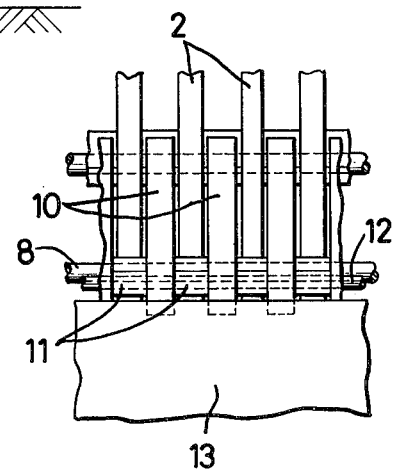
FIG. 4 is a side view of the portion shown in FIG. 3.

The rotary shaft 8 is pivoted by a suitable driving means between its operative position where the scrapers 10 have their tips disposed between the ring bars 2 as illustrated in FIG. 2 and its inoperative position where their tip are away from the ring bars 2. The circularly shaped base portion 10a of the scrapears is always positioned between the ring bars.

A chute 13 is arranged behind and below the scrapers 10 in an inclined position. A belt conveyor 14 is provided under the chute 13.

In operation, the bar screen 1 is rotated by the motor 7 in the direction of arrow with the scrapers 10 in their operative position. Any rubbish caught by or adhering to the ring bars 2 is brought up as the bar screen rotates. The rubbish is then scraped away from the bars by the scrapers 10 and falls down the chute 13 onto the belt conveyor 14.

With continued use, however, rubbish tends to get caught between the scrapers or between the scrapers and the ring bars 2, thus interfering with the smooth operation of the screen. This necessitates frequent cleaning of the bar screen to remove such residue from them. For this purpose, the scrapers 10 are swung around the rotary shaft 8 into their inoperative position. After cleaning, they are rotated to their original operative position. This return is smoothly effected since the scrapers 10 have their circular portion 10a always disposed between the ring bars 2, no matter whether they are in their operative or inoperative position. This facilitates resetting of the scrapers.

Although a preferred embodiment has been described, various changes or variations may be made without departing from the scope of this invention.

What is claimed is:

1. A bar screen for removing debris from liquid comprising:
    a plurality of uniformly spaced rotatable ring bars, said ring bars having a common longitudinal axis;
    a rotatable shaft adjacent the outer periphery of said ring bars, said shaft being parallel to the longitudinal axis of said ring bars; and
    a plurality of scraper means having a first end fixedly mounted on said shaft and rotatable therewith and a second end opposite said first end extending into the spaces between said spaced ring bars for scraping debris from said spaces, said first end being continuously positioned between said ring bars, and said second end being movable away from between said ring bars when said rotatable shaft rotates.

2. A bar screen as claimed in claim 1, further comprising:
    spacer means between said scraper means for spacing said scraper means from each other.

* * * * *